(12) United States Patent
Chen et al.

(10) Patent No.: US 12,036,567 B2
(45) Date of Patent: Jul. 16, 2024

(54) METHOD OF SHUTTING OFF WATER AND A WATER OUTLET DEVICE

(71) Applicant: Xiamen Solex High-Tech Industries Co., Ltd., Fujian (CN)

(72) Inventors: Donghai Chen, Fujian (CN); Fengde Lin, Fujian (CN); Bin Cao, Fujian (CN)

(73) Assignee: Xiamen Solex High-Tech Industries Co., Ltd., Fujian (CN)

( * ) Notice: Subject to any disclaimer, the term of this patent is extended or adjusted under 35 U.S.C. 154(b) by 200 days.

(21) Appl. No.: 17/712,720

(22) Filed: Apr. 4, 2022

(65) Prior Publication Data

US 2022/0314244 A1    Oct. 6, 2022

(30) Foreign Application Priority Data

Apr. 2, 2021    (CN) .......................... 202110362690.5

(51) Int. Cl.
*B05B 1/18*    (2006.01)
*F16K 21/04*   (2006.01)

(52) U.S. Cl.
CPC .............. *B05B 1/185* (2013.01); *F16K 21/04* (2013.01)

(58) Field of Classification Search
CPC ......... B05B 1/185; B05B 1/3006; B05B 1/18; B05B 11/1016; B05B 11/1036; F16K 21/04; F16K 21/06; B67D 3/043
See application file for complete search history.

(56) References Cited

U.S. PATENT DOCUMENTS

| | | | | | |
|---|---|---|---|---|---|
| 5,454,396 | A | * | 10/1995 | Hochstrasser | F16K 15/145 137/218 |
| 8,851,398 | B2 | * | 10/2014 | Li | B05B 1/1609 239/447 |
| 2011/0297759 | A1 | * | 12/2011 | Morbio | B05B 7/0425 4/615 |
| 2014/0217314 | A1 | * | 8/2014 | Kao | F16K 21/06 251/12 |
| 2015/0007770 | A1 | * | 1/2015 | Chandrasekharan | C23C 16/45572 239/548 |
| 2019/0344301 | A1 | * | 11/2019 | Zabari | C02F 1/688 |

FOREIGN PATENT DOCUMENTS

DE    102010021735 A1 * 11/2011 ............... B05B 1/18

* cited by examiner

*Primary Examiner* — Reinaldo Sanchez-Medina
*Assistant Examiner* — Nicole Gardner
(74) *Attorney, Agent, or Firm* — Cooper Legal Group LLC (57) ABSTRACT

A method for shutting off water that is applied to a water outlet device, which comprises enabling a volume of a variable chamber to increase to form a negative pressure chamber to suck residual water in a water outlet chamber into the negative pressure chamber by releasing negative pressure at a connection of the variable chamber and the water outlet chamber when the water is shut off. A method for shutting off water that is applied to a water outlet device, which comprises enabling a water shut-off sealing member to hermetically seal a connection of a water outlet hole and a water outlet chamber by a volume of air in the water outlet chamber of the water outlet device increasing to generate negative pressure when the water is shut off. A water outlet device is provided.

20 Claims, 6 Drawing Sheets

METHOD OF SHUTTING OFF WATER AND A WATER OUTLET DEVICE

RELATED APPLICATIONS

This application claims priority to Chinese patent application 202110362690.5, filed on Apr. 2, 2021. Chinese patent application 202110362690.5 is incorporated herein by reference.

FIELD OF THE DISCLOSURE

The present disclosure relates to a household product, and in particular relates to a water outlet device.

BACKGROUND OF THE DISCLOSURE

Some showers in the existing techniques are disposed with a movable plate that can move upward and downward in a chamber and seal a water outlet hole in a body. A pressure chamber is formed between the movable plate and a water outlet panel. When water is turned on for the shower and buoyancy of the water is enough to lift the movable plate, water flows from the shower. When the water is shut off for the shower, the buoyancy of the water in the pressure chamber decreases rapidly, so that the movable plate hermetically seals the water outlet hole again, and the water stops flowing from the shower, realizing anti-drip effects after showering. As the movable plate has a certain weight, the water needs to be held under pressure in the pressure chamber for a period of time, from the water being turned on for the shower until the water actually flows from the shower, to form sufficient buoyancy to lift up the movable plate, so the shower has problems of high starting water pressure and outflow delay.

BRIEF SUMMARY OF THE DISCLOSURE

A main technical problem of present disclosure to be resolved is to provide a method for shutting off water, a sensitivity is high, and a delay is low.

A main technical problem of present disclosure to be resolved is to provide another method for shutting off water, and quick stopping of shutting off of water is achieved at any angle.

In order to solve the aforementioned technical problems, the present disclosure provides a method for shutting off water that is applied to a water outlet device, which comprises enabling a volume of a variable chamber to increase to form a negative pressure chamber to suck residual water in a water outlet chamber into the negative pressure chamber by releasing negative pressure at a connection of the variable chamber and the water outlet chamber when the water is shut off.

In a preferred embodiment, which comprises enabling the volume of the variable chamber to decrease by generating the negative pressure at the connection of the variable chamber and the water outlet chamber when the water is turned on.

The present disclosure provides a method for shutting off water that is applied to a water outlet device, which comprises enabling a water shut-off sealing member to hermetically seal a connection of a water outlet hole and a water outlet chamber by a volume of air in the water outlet chamber of the water outlet device increasing to generate negative pressure when the water is shut off.

In a preferred embodiment, which comprises enabling a volume of a variable chamber to increase to form a negative pressure chamber to suck residual water in the water outlet chamber into the negative pressure chamber by releasing the negative pressure at a connection of the variable chamber and the water outlet chamber when the water is shut off.

In a preferred embodiment, which comprises enabling a volume of a variable chamber to decrease by generating the negative pressure at a connection of a variable chamber and the water outlet chamber when the water is turned on.

The present disclosure provides a water outlet device, which comprises a variable chamber and a water outlet chamber, the variable chamber and the water outlet chamber are disposed in the water outlet device, the variable chamber is in communication with the water outlet chamber, the variable chamber is independently disposed outside of the water outlet chamber, and volumes of the variable chamber are not equal when water is turned on and when the water is shut off to enable the variable chamber to generate a negative pressure chamber when the water is shut off.

In a preferred embodiment, the variable chamber is in communication with the water outlet chamber through a through hole. When the water is turned on, negative pressure is generated at the through hole, and the volume of the variable chamber is a first size. When the water is shut off, the negative pressure at the through hole disappears, and the volume of the variable chamber increases to a second size to form the negative pressure chamber.

In a preferred embodiment, the water outlet chamber comprises a flow passage having variable cross-sectional areas. After the water is accelerated through the flow passage having the variable cross-sectional areas, the negative pressure is generated at the through hole.

In a preferred embodiment, a piston is disposed in the water outlet device, the piston is hermetically sealed to an inner wall of the water outlet device to form the variable chamber, and the piston is connected to a spring. When the volume of the variable chamber is a first size, the spring is squeezed by the piston to accumulate an elastic restoring force.

In a preferred embodiment, the variable chamber is an elastic chamber made of elastic material, and when the volume of the variable chamber is a first size, the elastic material contracts to generate an elastic restoring force.

The present disclosure discloses a water outlet device, which comprises a variable chamber and a water outlet chamber, the variable chamber and the water outlet chamber are disposed in the water outlet device, the variable chamber is in communication with the water outlet chamber, the variable chamber is independently disposed outside of the water outlet chamber, a flow passage having variable cross-sectional areas comprises a through hole in communication with the variable chamber, and the water outlet chamber comprises the flow passage having the variable cross-sectional areas for accelerating water flowing through the flow passage having the variable cross-sectional areas to generate a negative pressure at the through hole.

In a preferred embodiment, when the water is turned on, the negative pressure is generated at the through hole, and a volume of the variable chamber is a first size. When the water is shut off, the negative pressure disappears at the through hole, and the volume of the variable chamber increases to a second size to form a negative pressure chamber.

In a preferred embodiment, a piston is disposed in the water outlet device, the piston is hermetically sealed to an inner wall of the water outlet device to form the variable chamber, and the piston is connected to a spring. When a volume of the variable chamber is a first size, the spring is squeezed by the piston to accumulate an elastic restoring force.

In a preferred embodiment, the variable chamber is an elastic chamber made of elastic material. When a volume of the variable chamber is a first size, the elastic material contracts to generate an elastic restoring force.

The present disclosure discloses a water outlet device, which comprises a variable chamber and a water outlet chamber. The variable chamber and the water outlet chamber are disposed in the water outlet device, the variable chamber is in communication with the water outlet chamber, and a Venturi structure is disposed in the water outlet device for generating negative pressure at a connection of the variable chamber and the water outlet chamber when water is turned on.

In a preferred embodiment, the Venturi structure comprises a through hole for the connection of the variable chamber and the water outlet chamber and a flow passage having variable cross-sectional areas disposed in the water outlet chamber.

In a preferred embodiment, when the water is turned on, the negative pressure is generated at the through hole, and a volume of the variable chamber is a first size. When the water is shut off, the negative pressure disappears at the through hole, and the volume of the variable chamber increases to a second size to form a negative pressure chamber.

In a preferred embodiment, a piston is disposed in the water outlet device, the piston is hermetically sealed to an inner wall of the water outlet device to form the variable chamber, and the piston is connected to a spring. When a volume of the variable chamber is a first size, the spring is squeezed by the piston to accumulate an elastic restoring force.

In a preferred embodiment, the variable chamber is an elastic chamber made of elastic material. When a volume of the variable chamber is a first size, the elastic material contracts to generate elastic restoring force.

A water outlet device, which comprises a variable chamber, a water outlet chamber, and a water shut-off sealing member, the variable chamber and the water outlet chamber are disposed in the water outlet device, and the water shut-off sealing member is disposed at a connection of a water outlet hole and the water outlet chamber. When water is shut off, residual water in the water outlet chamber is sucked into the variable chamber, a negative pressure is generated in the water outlet chamber, and a pressure difference between two sides of the water shut-off sealing member enables the water shut-off sealing member to be deformed to reach a position in which a connection of the water outlet hole and the water outlet chamber is hermetically sealed.

In a preferred embodiment, when the water is turned on, air in the variable chamber enters into the water outlet chamber, and water pressure is applied to the water shut-off sealing member to enable the water outlet hole to be in communication with the water outlet chamber.

In a preferred embodiment, the water shut-off sealing member is a one-way sheet having a cut opening.

In a preferred embodiment, the variable chamber is independently disposed outside of the water outlet chamber, and the variable chamber is in communication with the water outlet chamber through a through hole. When the water is turned on, negative pressure is generated at the through hole, and a volume of the variable chamber is a first size. When the water is shut off, the negative pressure disappears at the through hole, and the volume of the variable chamber increases to a second size to form a negative pressure chamber.

In a preferred embodiment, the water outlet chamber comprises a flow passage having variable cross-section areas, after the water is accelerated through the flow passage having the variable cross-sectional areas, the negative pressure is generated at the through hole.

In a preferred embodiment, a piston is disposed in the water outlet device, the piston is hermetically sealed to an inner wall of the water outlet device to form the variable chamber, and the piston is connected to a spring. When a volume of the variable chamber is a first size, the spring is squeezed by the piston to accumulate an elastic restoring force.

In a preferred embodiment, the variable chamber is an elastic chamber made of elastic material. When a volume of the variable chamber is a first size, the elastic material contracts to generate an elastic restoring force.

The present disclosure discloses a water outlet device, which comprises a variable chamber, a water outlet chamber, and a water shut-off sealing member, the variable chamber and the water outlet chamber are disposed in the water outlet device, the water shut-off sealing member is disposed at a connection of a water outlet hole and the water outlet chamber, the variable chamber is independently arranged outside of the water outlet chamber, and volumes of the variable chamber are not equal when water is turned on and when the water is shut off to enable the variable chamber to form a negative pressure chamber when the water is shut off. When the water is shut off, a pressure difference between two sides of the water shut-off sealing member enables the water shut-off sealing member to be deformed to reach a position in which the connection of the water outlet hole and the water outlet chamber is hermetically sealed.

In a preferred embodiment, when the water is turned on, air in the variable chamber enters into the water outlet chamber, water pressure is applied to the water shut-off sealing member to enable the water outlet hole to be in communication with the water outlet chamber.

In a preferred embodiment, the water shut-off sealing member is a one-way sheet with a cut opening.

In a preferred embodiment, the variable chamber is in communication with the water outlet chamber through a through hole. When the water is turned on, negative pressure is generated at the through hole, and the volume of the variable chamber is a first size. When the water is shut off, the negative pressure disappears at the through hole, and the volume of the variable chamber increases to a second size to form a negative pressure chamber.

In a preferred embodiment, the water outlet chamber comprises a flow passage having variable cross-section areas. After the water is accelerated through the flow passage having the variable cross-sectional areas, the negative pressure is generated at the through hole.

In a preferred embodiment, a piston is disposed in the water outlet device, the piston is hermetically sealed to an inner wall of the water outlet device to form the variable chamber, and the piston is connected to a spring. When the volume of the variable chamber is a first size, the spring is squeezed by the piston to accumulate an elastic restoring force.

In a preferred embodiment, the variable chamber is an elastic chamber made of elastic material. When the volume of the variable chamber is a first size, the elastic material contracts to generate an elastic restoring force.

The present disclosure discloses a water outlet device, which comprises a variable chamber, a water outlet chamber, and a water shut-off sealing member, the variable chamber and the water outlet chamber are disposed in the water outlet device, the water shut-off sealing member is disposed at a connection of a water outlet hole and the water outlet chamber, and a Venturi structure is disposed in the water outlet device for generating negative pressure at a connection of the variable chamber and the water outlet chamber when water is turned on. When the water is shut off, a pressure difference between two sides of the water shut-off sealing member enables the water shut-off sealing member to be deformed to reach a position in which the connection of the water outlet hole and the water outlet chamber is hermetically sealed.

In a preferred embodiment, when the water is turned on, air in the variable chamber enters into the water outlet chamber, and water pressure is applied to the water shut-off sealing member to enable the water outlet hole to be in communication with the water outlet chamber.

In a preferred embodiment, the water shut-off sealing member is a one-way sheet with a cut opening.

In a preferred embodiment, the Venturi structure comprises a through hole for a connection of the variable chamber and the water outlet chamber and a flow passage having variable cross-sectional areas disposed in the water outlet chamber.

In a preferred embodiment, when the water is turned on, a negative pressure is generated at the through hole, and a volume of the variable chamber is a first size. When the water is shut off, the negative pressure disappears at the through hole, and the volume of the variable chamber increases to a second size to form a negative pressure chamber.

In a preferred embodiment, a piston is disposed in the water outlet device, the piston is hermetically sealed to an inner wall of the water outlet device to form the variable chamber, and the piston is connected to a spring. When a volume of the variable chamber is a first size, the spring is squeezed by the piston to accumulate an elastic restoring force.

In a preferred embodiment, the variable chamber is an elastic chamber made of elastic material. When a volume of the variable chamber is a first size, the elastic material contracts to generate an elastic restoring force.

Compared with the existing techniques, the technical solution has the following advantages.

1. The present disclosure provides a method for shutting off water and a water outlet device. When water is turned on, the water is accelerated through a flow passage having a variable cross-sectional area (e.g., a decreased cross-sectional area or a tapered cross-sectional area). According to the Bernoulli equation, pressure energy can be reduced, so negative pressure is generated on the flow passage having the variable cross-sectional area. A through hole on the flow passage having the variable cross-sectional area is connected to the variable chamber, so that air in the variable chamber is sucked away to enable the piston move inward against an elastic force of a spring under an action of external atmospheric air pressure.

When the water is shut off, the negative pressure at the through hole disappears (which is restored to a state of approximately atmospheric air pressure), and the piston moves outward against the external atmospheric air pressure under the elastic force of the spring and the approximately atmospheric air pressure. At this time, the air in the variable chamber generates negative pressure due to a volume of the variable chamber increasing, and residual water in a water outlet chamber is sucked into the variable chamber through the through hole so as to achieve quick stopping effects of shutting off of water.

As the variable chamber is independently disposed outside of the water outlet chamber, a decreasing of the volume of the variable chamber does not depend on water pressure acting on the variable chamber when the water is turned on. In this way, even in case the water pressure is relatively low when the water is turned on, the water can also be output smoothly.

2. The present disclosure further provides a method for shutting off water and a water outlet device. A water shut-off sealing member disposed at a connection of the water outlet hole and the water outlet chamber is added based on the above-mentioned method. When the water is shut off, as the residual water in the water outlet chamber is sucked into the variable chamber, a volume of the air in the water outlet chamber increases, and the negative pressure is generated. The external atmospheric air pressure acts on a one-way sheet having a cut opening, so that the one-way sheet having the cut opening is arched upward to achieve quick stopping effects of shutting off of water. At the same time, the water maintained in the water outlet hole is sucked backward due to the one-way sheet with the cut opening arching upward, so that there is no residual water on a surface of the water outlet hole. In this way, even in case the water outlet device is not in a horizontal state, external air will not enter into the water outlet chamber, and the quick stopping of the shutting off of water at any angle can be achieved. When water is turned on, the air in the variable chamber enters into the water outlet chamber, and water pressure of out-flowing water acts on the water shut-off sealing member to push the water shut-off sealing member downward, thereby restoring the connection of the water outlet hole and the water outlet chamber.

3. The above-mentioned method for shutting off water and the water outlet device have very high sensitivity. Water output can be realized as soon as the water is turned on, and the water can be stopped as soon as the water is shut off, and a starting water pressure is further relatively low.

BRIEF DESCRIPTION OF THE DRAWINGS

FIG. 3 illustrates a cross-sectional view of a shower of Embodiment 1 of the present disclosure when water is turned on;

FIG. 5 illustrates a cross-sectional view of a shower of Embodiment 2 of the present disclosure when water is turned on;

DETAILED DESCRIPTION OF THE EMBODIMENTS

The technical solutions of embodiments of the present disclosure will be clearly and completely described below in combination with the accompanying drawings and embodiments of the present disclosure. It is obvious that the described embodiments are only some embodiments of the present disclosure and are not all embodiments, and the present disclosure covers all other embodiments provided they are made without creative works by those having ordinary skill in the art based on the embodiments of the present disclosure.

In the description of the present disclosure, it should be noted that the terms "upper", "lower", "inner", "outer", "top/bottom", etc. indicate an orientation or a positional relationship based on the orientation shown in the drawings. The positional relationship is only for convenience for describing the present disclosure and simplifying the description, rather than indicating or implying that the pointed device or the pointed element must have a specific orientation or be constructed and operated in the specific orientation, and therefore should not be understood as a limitation of the present disclosure. In addition, the terms "first" and "second" are only used for descriptive purposes and should not be understood as indicating or implying relative importance.

In the description of the present disclosure, unless otherwise described, it should be noted that the terms "installed", "disposed with", "socketed/sleeved", "connected", etc., should be broadly understood, such as "connection" can be a wall-mounted connection, a detachable connection, or an integral connection, a mechanical connection, an electrical connection, a direct connection, an indirect connection through an intermediate medium, and a connection between two components. For those of ordinary skill in the art, the specific meaning of the above-mentioned terms in the present disclosure can be understood under specific conditions.

This embodiment provides a first method for shutting off water, which is applied to a water outlet device. The first method comprises a step that when water is shut off, negative pressure is released at a connection of a variable chamber 1 and a water outlet chamber 2, so that a volume of the variable chamber 1 increases to form a negative pressure chamber to suck residual water in the water outlet chamber 2 into the negative pressure chamber. When the water is shut off, the residual water in the water outlet chamber 2 can be directly sucked into the negative pressure chamber to form quick stopping effects of shutting off of water by this step. In this way, when the water is shut off, out-flowing water from the water outlet device can be shut off immediately such that the water is shut off without waiting for buoyancy of the water in the pressure chamber decreasing, just like the existing techniques. In this way, sensitivity is relatively high.

The aforementioned technical solution achieves quick stopping of the shutting off of water. In order to achieve a volume of the variable chamber 1 being variable, this embodiment further comprises a step that the volume of the variable chamber 1 of the water outlet device decreases when the water is turned on. In this way, the volume of the variable chamber 1 is relatively small when the water is turned on, which provides a basis for increasing the volume when the water is shut off.

In order to achieve the volume of the variable chamber 1 changing, when the water is turned on, a negative pressure is generated at the connection of the variable chamber 1 and the water outlet chamber 2. Air in the variable chamber 1 enters into the water outlet chamber 2, and the volume of the variable chamber 1 decreases. When the water is shut off, the negative pressure disappears at the connection of the variable chamber 1 and the water outlet chamber 2, the variable chamber 1 can expand due to an elastic restoring force, and the volume of the variable chamber 1 increases. Further, as the variable chamber 1 is independently disposed outside of the water outlet chamber 2, the decreasing of the volume of the variable chamber 1 does not depend on water pressure acting on the variable chamber 1 when the water is turned on. Therefore, even in case that the water pressure is relatively low when the water is turned on, the water can flow out smoothly.

The aforementioned technical solution is suitably applied to a state in which the water outlet device is maintained horizontal. Therefore, in this state, after the water is shut off, everywhere in the water outlet chamber 2 is filled with water, and the water in the water outlet chamber 2 can be only sucked into the variable chamber 1 by the negative pressure. Once the water outlet device is inclined, the residual water in the water outlet chamber 2 will flow to an inclined side of the water outlet chamber 2, causing a part of the water outlet chamber 2 to be in communication with external atmospheric air pressure. At this time, the water outlet chamber 2 cannot generate the negative pressure, and the residual water cannot be maintained in the water outlet chamber 2. Therefore, the residual water will still drip from a water outlet hole 3, and the quick stopping effects of the shutting off of water cannot be achieved.

Therefore, in order to solve the aforementioned technical problems, this embodiment further provides a second method for shutting off water, which is applied to the water outlet device. The second method comprises a step that when the water is shut off, a volume of air in the water outlet chamber 2 of the water outlet device increases to generate a negative pressure, so that a water shut-off sealing member 4 at the water outlet hole 3 is hermetically sealed with the connection of the water outlet chamber 2 and the water outlet hole 3.

Due to the water shut-off sealing member 4 being added, when the residual water in the water outlet chamber 2 is sucked into the variable chamber 1, the volume of the air in the water outlet chamber 2 increases to generate the negative pressure. Therefore, a pressure difference is formed at two sides of the water shut-off sealing member 4. Therefore, the water shut-off sealing member 4 is upwardly arched, and a connection of the water outlet hole 3 and the water outlet chamber 2 is hermetically sealed. In this way, even in case the water outlet device is inclined, no air will enter into the water outlet chamber 2 from the water outlet hole 3, which ensures that the quick stopping effects of the shutting off of water at any angle is maintained.

Further, water with low pressure can be turned on using this method. When the water is turned on, a pressure of out-flowing water in the water outlet chamber 2 is applied to the water shut-off sealing member 4 to push the water shut-off sealing member 4 to move downward, so that the connection of the water outlet hole 3 and the water outlet chamber 2 is reset. Therefore, the water pressure required is relatively low using this turn-on method, and rapidly turning on water can be achieved under a low pressure.

In order to achieve the aforementioned method for shutting off water, this embodiment provides two applicable structures. It should be noted that this embodiment uses a top spray shower as an example. However, a structure of this part can be also applied to other water outlet devices, which is a simple replacement of this embodiment and will not be repeatedly described herewith.

Embodiment 1

Referring to FIGS. 1 to 4, this embodiment provides a water outlet device, which comprises a variable chamber 1 and a water outlet chamber 2 that are disposed in the water outlet device. The variable chamber 1 is in communication with the water outlet chamber 2. The variable chamber 1 is independently disposed outside of the water outlet chamber 2. The variable chamber 1 being independently disposed outside of the water outlet chamber 2 means that when water flows through the water outlet chamber 2, the water will not enter into the variable chamber 1 from a connection of the variable chamber 1 and the water outlet chamber 2. For example, the variable chamber 1 can be disposed on an outer periphery of the water outlet chamber 2, and a center line of the variable chamber 1 can be perpendicular to a water flow direction. Or, the center line of the variable chamber 1 and the water flow direction can form an angle. The variable chamber 1 being independently disposed outside of the water flow direction of the water outlet chamber 2 means that when the water flows through the water outlet chamber 2, the water will not enter into the variable chamber 1 from the connection of the variable chamber 1 and the water outlet chamber 2.

The water outlet chamber 2 comprises a flow passage 5 having variable cross-sectional areas for accelerating the water that flows through the flow passage 5 having the variable cross-sectional areas. Preferably, the variable chamber 1 is disposed on an outer periphery of the flow passage 5 having variable cross sections, and the flow passage 5 having the variable cross-sectional areas comprises a through hole 6 in communication with the variable chamber 1. In this embodiment, the through hole 6 comprises a first opening 61 disposed on the variable chamber 1 and a second opening 62 disposed on the flow passage 5 having the variable cross sections. The first opening 61 is in communication with the second opening 62 through the water outlet chamber 2. In the aforementioned water outlet device, after installation, when the water is turned on for a first time, the water is accelerated through the flow passage 5 having decreased cross-sectional areas (i.e., tapered cross-sectional areas). According to the Bernoulli equation, as kinetic energy increases, pressure energy decreases, so that negative pressure is generated at the flow passage 5 having the variable cross-sectional areas. The second opening 62 disposed on the flow passage 5 having the variable cross-sectional areas is in communication with the first opening 61 of the variable chamber 1 to enable air in the variable chamber 1 to be sucked away, so that the variable chamber 1 contracts and a volume of the variable chamber 1 decreases due to the external atmospheric air pressure. When the water is shut off, the negative pressure at the second opening 62 disappears (which restores to a state of approximately atmospheric air pressure), and the volume of the variable chamber 1 increases. In this way, the volume of the variable chamber 1 changes following with a change between a water turn-on state and a water shut-off state, so that the variable chamber 1 forms a negative pressure chamber when the water is shut off.

Figure 3:
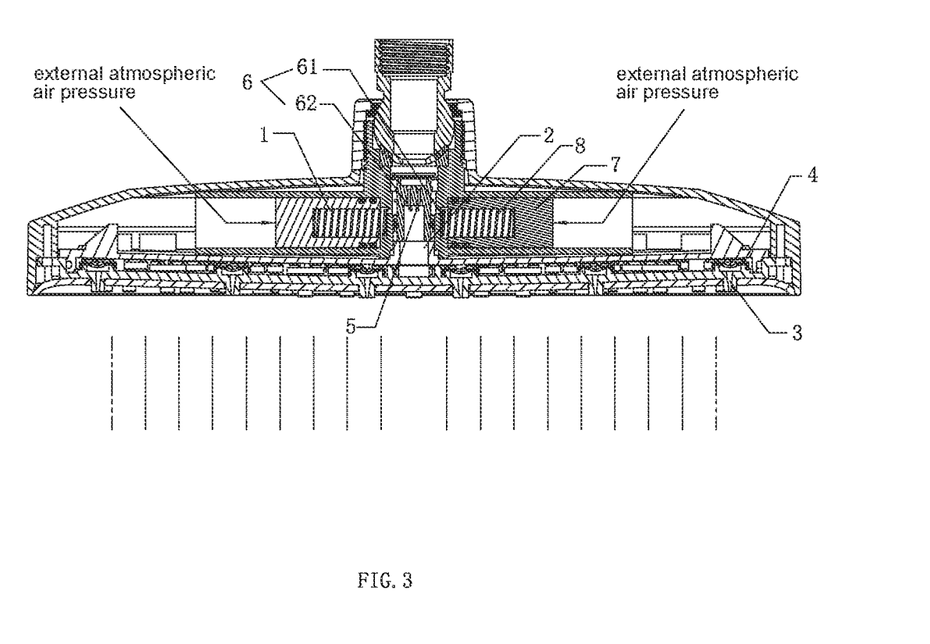
Figure 4:
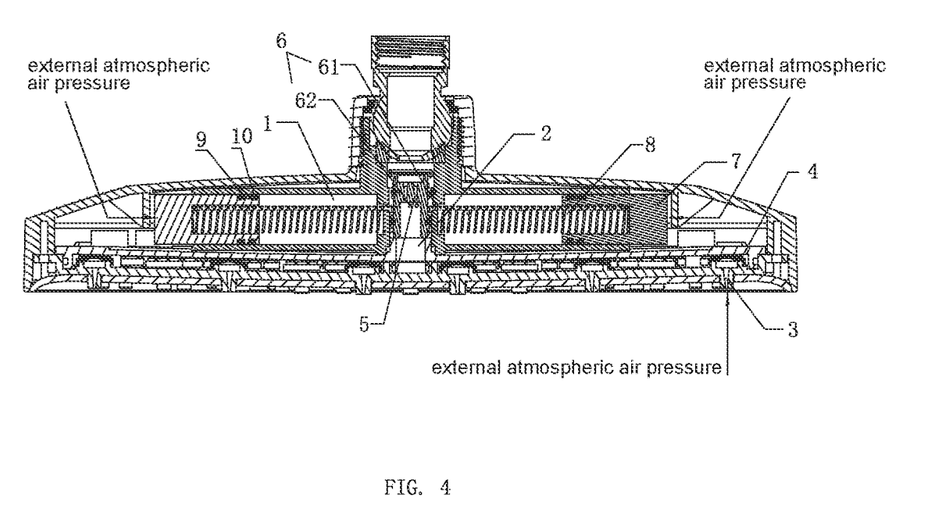
FIG. 4 illustrates a cross-sectional view of the shower of Embodiment 1 of the present disclosure when the water is shut off.

In this embodiment, a piston 7 is disposed in the water outlet device, and the piston 7 is hermetically sealed to an inner wall of the water outlet device to form the variable chamber 1. A side of the piston 7 facing a fixed end of the variable chamber 1 is connected to a spring 8. When the volume of the variable chamber 1 decreases, the spring 8 is squeezed by the piston 7 to accumulate an elastic restoring force. When the negative pressure at the second opening 62 disappears, the piston 7 moves in a direction along which the volume of the variable chamber 1 increases under a combined action of the elastic restoring force and the atmospheric air pressure, so that the volume of the variable chamber 1 increases to form a negative pressure chamber and the residual water in the water outlet chamber 2 is sucked into the variable chamber 1 through the first opening 61 and the second opening 62. When the water is turned on each time after the first time, the water is accelerated through the flow passage having decreased cross-sectional areas. According to the Bernoulli equation, as the kinetic energy increases, the pressure energy decreases. Therefore, the negative pressure is generated at the flow passage 5 having the variable cross-sectional areas, and the second opening 62 of the flow passage 5 having variable cross-sectional areas is in communication with the first opening 61 of the variable chamber 1, so that the air in the variable chamber 1 and the water sucked into the variable chamber 1 when the water is shut off in a previous time is sucked into the water outlet chamber 2. In this embodiment, a movement direction of the piston 7 is perpendicular to the water flow direction in the water outlet chamber 2.

In order to achieve a hermetically sealed connection of the piston 7 and the inner wall of the water outlet device, the piston 7 is connected to the inner wall of the water outlet device through two Y-shaped sealing rings 9 and 10. The two Y-shaped sealing rings 9 and 10 are disposed in opposite directions, so that one Y-shaped sealing ring 9 of the two Y-shaped sealing rings 9 and 10 is used to hermetically seal and isolate the external atmosphere air from the variable chamber 1, and the other Y-shaped sealing ring 10 of the two Y-shaped sealing rings 9 and 10 is used to hermetically seal the residual water sucked into the variable chamber 1 when the water is shut off, so as to prevent the residual water from flowing out from this position.

Figure 1:
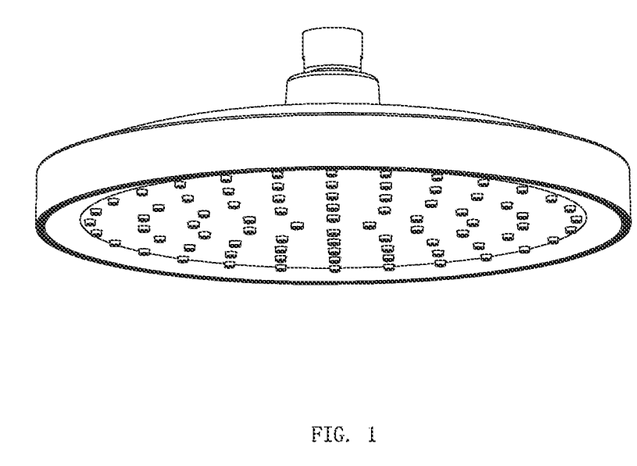
FIG. 1 illustrates a perspective view of Embodiment 1 of the present disclosure.
Figure 2:
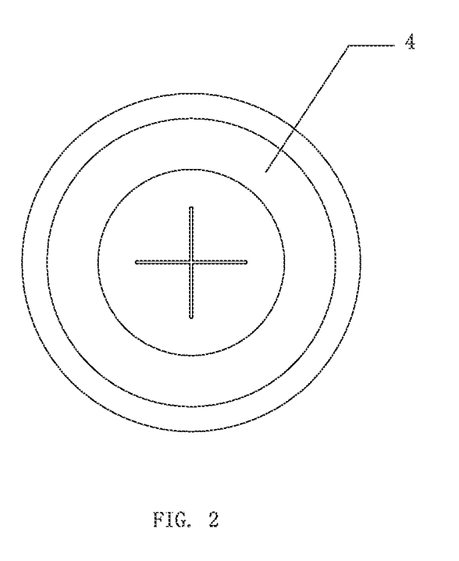
FIG. 2 illustrates a structural view of a water shut-off sealing member of Embodiment 1 of the present disclosure.

In order to further achieve the quick stopping effects of the shutting off of water at any angle, in this embodiment, a water shut-off sealing member 4 is disposed on a connection of the water outlet hole 3 and the water outlet chamber 2.

When the water is shut off, the residual water in the water outlet chamber 2 is sucked into the variable chamber 1, so that a negative pressure is generated in the water outlet chamber 2. The pressure difference between the two sides of the water shut-off sealing member 4 causes the water shut-off sealing member 4 to move to a position in which the connection of the water outlet hole 3 and the water outlet chamber 2 is hermetically sealed.

Furthermore, the water shut-off sealing member 4 is a one-way sheet having a cut opening. When the water is shut off, the residual water in the water outlet chamber 2 is sucked into the variable chamber 1, so that the volume of the air in the water outlet chamber 2 increases to generate the negative pressure. The external atmospheric air pressure acts on the one-way sheet having the cut opening, so that the one-way sheet is upwardly arched to achieve the quick stopping effects of the shutting off of water. At the same time, the water received in the water outlet hole 3 is backwardly sucked due to the one-way sheet upwardly arching, so that there is no residual water on a surface of the water outlet hole 3. In this way, even in case that the water outlet device is not in the horizontal state, external atmospheric air will not enter into the water outlet chamber 2, and quick stopping of the shutting off of water at any angle can be achieved. When water is turned on, the air in the variable chamber 1 enters into the water outlet chamber 2, and a pressure of the out-flowing water is applied to the water shut-off sealing member 4 to push the water shut-off sealing member 4 to move downward and the cut opening of the water shut-off sealing member 4 is opened, so that the connection of the water outlet hole 3 and the water outlet chamber 2 is reset.

Embodiment 2

Figure 5:
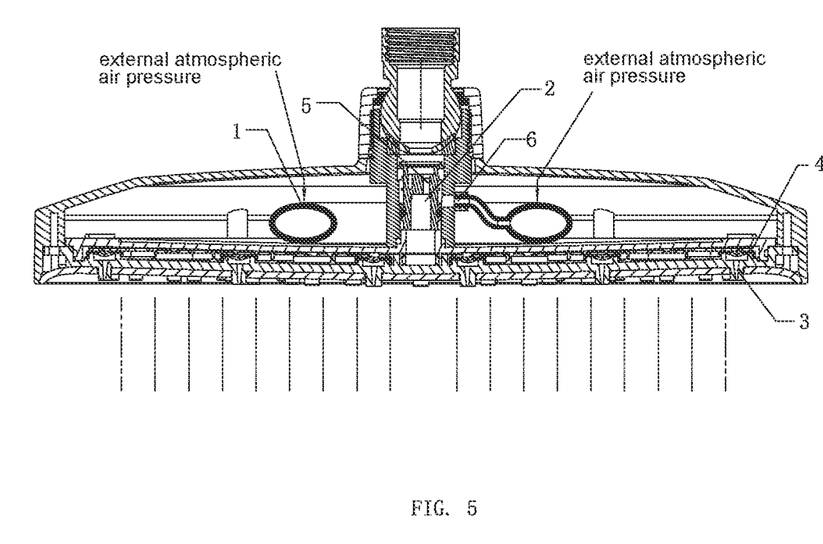
Figure 6:
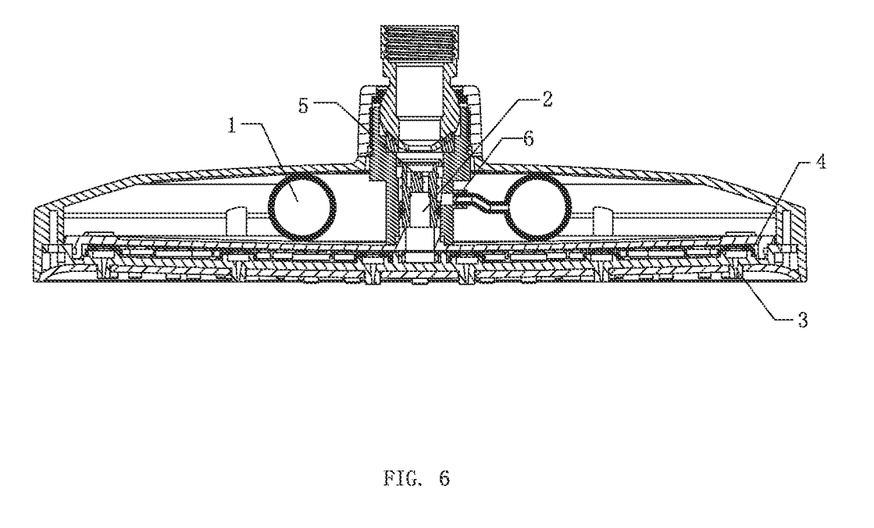
FIG. 6 illustrates a cross-sectional view of the shower of Embodiment 2 of the present disclosure when the water is shut off.

Referring to FIGS. 5 and 6, this embodiment differs from Embodiment 1 in that the variable chamber 1 is an elastic chamber made of an elastic material. When the volume of the variable chamber 1 decreases, the elastic material contracts to generate an elastic restoring force. This can also enable the volume of the variable chamber 1 to change following with a change between a water turn-on state and a water shut-off state, so that the variable chamber 1 forms a negative pressure chamber when the water is shut off. In this embodiment, the elastic material is selected from elastic silicone. The rest of the embodiment is the same as Embodiment 1 and will not be repeatedly described herewith.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

What is claimed is:

1. A method for shutting off water that is applied to a water outlet device, comprising:
    enabling a water shut-off sealing member to hermetically seal a connection of a water outlet hole and a water outlet chamber by increasing a volume of the water outlet chamber of the water outlet device for accommodating air to generate negative pressure when the water is shut off.

2. The method according to claim 1, comprising:
    enabling a volume of a variable chamber to increase to form a negative pressure chamber to suck residual water in the water outlet chamber into the negative pressure chamber by releasing the negative pressure at a connection of the variable chamber and the water outlet chamber when the water is shut off.

3. The method according to claim 1, comprising:
    enabling a volume of a variable chamber to decrease by generating the negative pressure at a connection of the variable chamber and the water outlet chamber when the water is turned on.

4. A water outlet device, comprising:
    a variable chamber, and
    a water outlet chamber, wherein:
        the variable chamber and the water outlet chamber are disposed in the water outlet device,
        the variable chamber is in communication with the water outlet chamber,
        the variable chamber is independently disposed outside of the water outlet chamber, and
        a volume of the variable chamber when water is turned on is not equal to the volume of the variable chamber when the water is shut off to enable the volume of the variable chamber to increase to generate a negative pressure chamber when the water is shut off.

5. The water outlet device according to claim 4, wherein:
    the variable chamber is in communication with the water outlet chamber through a through hole,
    when the water is turned on, negative pressure is generated at the through hole, and the volume of the variable chamber is a first size, and
    when the water is shut off, the negative pressure at the through hole disappears, and the volume of the variable chamber increases to a second size to form the negative pressure chamber.

6. The water outlet device according to claim 5, wherein:
    the water outlet chamber comprises a flow passage having variable cross-sectional areas, and
    after the water is accelerated through the flow passage having the variable cross-sectional areas, the negative pressure is generated at the through hole.

7. The water outlet device according to claim 4, wherein:
    a piston is disposed in the water outlet device,
    the piston is hermetically sealed to an inner wall of the water outlet device to form the variable chamber,
    the piston is connected to a spring, and
    when the volume of the variable chamber is a first size, the spring is squeezed by the piston to accumulate an elastic restoring force.

8. The water outlet device according to claim 4, wherein:
    the variable chamber is an elastic chamber made of elastic material, and
    when the volume of the variable chamber is a first size, the elastic material contracts to generate an elastic restoring force.

9. The water outlet device according to claim 4, comprising:
    a water shut-off sealing member, wherein:
        the water shut-off sealing member is disposed at a connection of a water outlet hole and the water outlet chamber,
        when the water is shut off, a pressure difference between two sides of the water shut-off sealing member enables the water shut-off sealing member to be deformed to reach a position in which the connection of the water outlet hole and the water outlet chamber is hermetically sealed.

10. The water outlet device according to claim 9, wherein:
    when the water is turned on:
        air in the variable chamber enters into the water outlet chamber, and
        water pressure is applied to the water shut-off sealing member to enable the water outlet hole to be in communication with the water outlet chamber.

11. A water outlet device, comprising:
    a variable chamber, and
    a water outlet chamber, wherein:
        the variable chamber and the water outlet chamber are disposed in the water outlet device,
        the variable chamber is in communication with the water outlet chamber,
        the variable chamber is independently disposed outside of the water outlet chamber,
        a flow passage having variable cross-sectional areas comprises a through hole in communication with the variable chamber, and
        the water outlet chamber comprises the flow passage having the variable cross-sectional areas for accelerating water flowing through the flow passage having a decreased cross-sectional area to generate a negative pressure at the through hole according to Bernoulli equation.

12. The water outlet device according to claim 11, wherein:
    when the water is turned on:
        the negative pressure is generated at the through hole, and
        a volume of the variable chamber is a first size, and
    when the water is shut off:
        the negative pressure disappears at the through hole, and
        the volume of the variable chamber increases to a second size to form a negative pressure chamber.

13. The water outlet device according to claim 11, wherein:
- a piston is disposed in the water outlet device,
- the piston is hermetically sealed to an inner wall of the water outlet device to form the variable chamber,
- the piston is connected to a spring, and
- when a volume of the variable chamber is a first size, the spring is squeezed by the piston to accumulate an elastic restoring force.

14. The water outlet device according to claim 11, wherein:
- the variable chamber is an elastic chamber made of elastic material, and
- when a volume of the variable chamber is a first size, the elastic material contracts to generate an elastic restoring force.

15. A water outlet device, comprising:
- a variable chamber,
- a water outlet chamber, and
- a water shut-off sealing member, wherein:
  - the variable chamber and the water outlet chamber are disposed in the water outlet device,
  - the water shut-off sealing member is disposed at a connection of a water outlet hole and the water outlet chamber, and
  - when water is shut off:
    - a volume of the variable chamber increases to enable residual water in the water outlet chamber to be sucked into the variable chamber to generate a negative pressure in the water outlet chamber, and
    - a pressure difference between two sides of the water shut-off sealing member enables the water shut-off sealing member to be deformed to reach a position in which the connection of the water outlet hole and the water outlet chamber is hermetically sealed.

16. The water outlet device according to claim 15, wherein:
- when the water is turned on:
  - air in the variable chamber enters into the water outlet chamber, and
  - water pressure is applied to the water shut-off sealing member to enable the water outlet hole to be in communication with the water outlet chamber.

17. The water outlet device according to claim 16, wherein:
- a piston is disposed in the water outlet device,
- the piston is hermetically sealed to an inner wall of the water outlet device to form the variable chamber,
- the piston is connected to a spring, and
- when the volume of the variable chamber is a first size, the spring is squeezed by the piston to accumulate an elastic restoring force.

18. The water outlet device according to claim 16, wherein:
- the variable chamber is an elastic chamber made of elastic material, and
- when the volume of the variable chamber is a first size, the elastic material contracts to generate an elastic restoring force.

19. The water outlet device according to claim 15, wherein:
- the variable chamber is independently disposed outside of the water outlet chamber,
- the variable chamber is in communication with the water outlet chamber through a through hole,
- when the water is turned on:
  - the negative pressure is generated at the through hole, and
  - the volume of the variable chamber is a first size, and
- when the water is shut off:
  - the negative pressure disappears at the through hole, and
  - the volume of the variable chamber increases to a second size to form a negative pressure chamber.

20. The water outlet device according to claim 19, wherein:
- the water outlet chamber comprises a flow passage having variable cross-sectional areas, and
- after the water is accelerated through the flow passage having the variable cross-sectional areas, the negative pressure is generated at the through hole.

* * * * *